Patented Apr. 20, 1937

2,078,194

UNITED STATES PATENT OFFICE 2,078,194

DRYING OILS AND PROCESS OF MAKING SAME

Arnold M. Collins, Wilmington, Del., assignor to E. I. du Pont de Nemours & Company, Wilmington, Del., a corporation of Delaware No Drawing. Application August 4, 1932, Serial No. 627,460

37 Claims. (Cl. 260—2)

This invention relates to the arts of drying oils and of coating compositions, and more particularly to certain improved synthetic drying oils and coating compositions and to processes for making them. The invention more particularly pertains to the preparation of homogeneous synthetic drying oils by reacting divinylacetylene or other polymerizable non-benzenoid acetylene polymer with drying oils.

The natural drying oils now used in the manufacture of decorative and protective coatings have the disadvantage that they dry and harden slowly. It has been found, however, as described and claimed in U. S. Patents 1,812,544 and 1,812,849 issued to A. M. Collins, that products which have the general properties of drying oils and which dry and harden rapidly may be made by polymerizing highly unsaturated hydrocarbons such as divinylacetylene. Films of these synthetic drying oils are very hard and exceptionally resistant to the action of water, organic solvents, and strong acids and alkalies. Such products, however, even when mixed as described in the first of the above identified patents with flexibilizing agents such as natural drying oils, are not sufficiently flexible and adhesive for certain uses where great flexibility is required.

It is therefore an object of this invention to provide new synthetic drying oils having a greater degree of flexibility and adhesion than the synthetic drying oils previously known while retaining the rapid drying, hardness, and resistance to the action of solvents, characteristic of the products already developed. Another object of the invention pertains to the polymerization of divinylacetylene with other materials, to yield homogeneous compatible film-forming compositions. A more specific object relates to the interpolymerization of divinylacetylene with drying oils, preferably in the presence of polybasic acids or with drying oil modified resins, e. g. polybasic acid-polyhydric alcohol condensation products. Other objects of the invention will be apparent from the following description of the invention.

These objects are accomplished in their preferred form by the following invention in which divinylacetylene or other highly unsaturated hydrocarbon having an analogous chemical structure is caused to react with an ester of a drying oil acid.

Under the term "ester of a drying oil acid" is included a wide variety of products both natural and synthetic. By "drying oil acid" is meant a highly unsaturated organic acid such as linoleic, linolenic, eleostearic, clupanodonic, etc., which occur as glycerides in natural drying oils, such as linseed oil, China-wood oil, soya bean oil, fish oil, parilla oil, sunflower seed oil, China oil, oiticica oil, rape oil, rubber seed oil, and the like, and which are obtained therefrom by hydrolysis. Also included under the term "drying oil acid" are synthetically prepared acids, such as sorbic acid, which have a chemical structure and drying properties similar to those of the drying oil acids obtained from natural sources. The esters of the drying oil acids which are used in the present invention may be, in the first place, esters formed by the esterification of either a monohydric or a polyhydric alcohol (including ether alcohols) with a drying oil acid. In this class are included the natural drying oils themselves. On the other hand, more complex esters may be used for the purpose of this invention, such as those formed by the esterification of polyhydric alcohols, in part by polybasic acids, and in part by drying oil acids. The synthetic resins known as "drying oil modified alkyd resins" are examples of this class.

The utilization of the simple esters of drying oil acids will first be illustrated by the following examples:

Example I

Eighty grams of freshly distilled divinylacetylene boiling between 20° and 53° C. at a pressure of 250 mm. of mercury is refluxed in an atmosphere of carbon dioxide with 20 g. of China-wood oil and 1.5 g. of phthalic anhydride. The temperature of the boiling liquid is about 85° C. at atmospheric pressure. After two hours at this temperature, 50 g. of xylene is added and the solution is distilled under reduced pressure until about 100 g. of liquid, containing all the unchanged divinylacetylene and part of the xylene, is removed. The residue is then freed from phthalic anhydride by cooling to 0° C., or below and filtering off the crystals of phthalic anhydride. Both the phthalic anhydride and the unchanged divinylacetylene may be recovered, if desired, and used for preparation of more of the modified synthetic drying oil. The product remaining after the removal of the unchanged divinylacetylene and phthalic anhydride is a clear, light-colored liquid consisting of a solution in xylene of the modified synthetic drying oil, the drying oil itself containing approximately 75% of combined China-wood oil. This solution may be used as a coating composition, preferably after the addition of an agent to prevent frosting, for example, cobalt linoleate solution in amount sufficient to provide cobalt equal to 0.03% of the weight of the modified synthetic drying oil. The composition dried in about two hours, and yields a hard film with excellent flexibility and adhesion and with good resistance to the action of hot water, steam and organic solvents.

Example II

Equal weights of China-wood oil and acetylene tetramer are heated in an atmosphere of nitrogen for 1½ hours at 100° C. The resulting viscous liquid may be used directly as a coating composition or, preferably, the unchanged tetramer of acetylene may first be removed by the addition of xylene followed by distillation at low pressure until substantially all of the unused tetramer has been removed. The resulting modified synthetic drying oil contains about 75% of combined China-wood oil and gives films similar to those in Example I.

*Example III*

Eight hundred forty three grams of divinylacetylene such as used in Example I above, 156 g. of China-wood oil and 1.3 g. of maleic anhydride are refluxed for 5½ hours in an atmosphere of nitrogen. Six hundred grams of xylene is then added and the resulting mixture is distilled in vacuo until 428 g. of liquid, representing all the unchanged divinylacetylene and part of the xylene, has been removed. The residual solution contains approximately 75% of a modified synthetic drying oil containing approximately 50% of combined China-wood oil. The synthetic drying oil dries in 1½ to 2 hours, giving a hard film which is very resistant to the action of water, steam and organic solvents, and is only slightly less flexible than the products of Examples I and II. In common with other synthetic drying oils which contain combined natural drying oils, this product is miscible with either natural drying oils or with the unmodified synthetic drying oils obtained by polymerization of divinylacetylene alone. These mixtures yield clear homogeneous films. Thus, the proportion of natural drying oil in the film may be varied by the addition of a proper material after the preparation of the modified synthetic drying oil itself, as well as by variation of the procedure used in bringing about the combination of the unsaturated hydrocarbon with the natural drying oil, as will be described below.

*Example IV*

Eighty-eight grams of divinylacetylene, 11 g. of the linoleate of diethylene glycol and 1 g. of maleic anhydride are refluxed as in the preceding examples for 1½ hours. An approximately equal volume of toluene is then added and the unchanged divinylacetylene removed by vacuum distillation. The remaining solution in toluene of a synthetic drying oil containing approximately 36% of the combined linoleate gives films which dry in about 2 hours, giving hard coatings of excellent flexibility and adhesion.

*Example V*

Ninety-seven grams of China-wood oil, 97 g. of linseed oil, 791 g. of divinylacetylene and 15 g. of maleic anhydride are refluxed as in the preceding examples for two hours. The unchanged divinylacetylene is then removed by distillation in the presence of xylene, as described above. The resulting modified synthetic drying oil contains 42% of combined linoleate and is similar in properties to the product of Example III.

*Example VI*

One hundred twenty grams of China-wood oil, 30 g. of ester gum and 850 g. of divinylacetylene are refluxed in the usual manner for 7 hours. After the removal of the unchanged divinylacetylene, there remains a solution of a modified synthetic drying oil containing 40% of combined China-wood oil and 10% of ester gum. It dries in about 1 hour, yielding a hard film of good flexibility and adhesion and only slightly inferior in its resistance to water and steam to that of Example III.

It will be seen from the above examples and discussions that this process for producing flexible synthetic drying oils differs in many respects from that disclosed in the above identified patents, for example, according to the present invention, highly unsaturated hydrocarbons are heated with esters of drying oil acids with the formation of homogeneous products from which the original drying oil compound can not be removed and which are believed to be formed by the chemical combination of the unsaturated hydrocarbon with the drying oil ester. On the other hand, in the preparation of the flexible product disclosed in the above patents, the unsaturated hydrocarbon is first polymerized and then mixed with the natural drying oil or similar compound. The product resulting in the latter case is therefore simply a mixture from which the natural drying oil may be removed by extraction with suitable reagents. Furthermore, the products of the present invention have greater flexibility and greater adhesion than the corresponding mixtures and in addition may be prepared so as to contain practically any desired proportion of combined drying oil, whereas, the mixtures of synthetic and natural drying oils are homogeneous only in certain proportions.

Although it is believed that the practice of the present invention leads to the formation of interpolymers or reaction products formed by interaction of the divinylacetylene etc., with drying oils, I do not wish to be limited to this theory, since regardless of the mechanism of the process, novel products having new and highly useful properties are obtained.

The divinylacetylene and tetramer of acetylene (which is believed to be butadienyl vinylacetylene) used in the above examples are prepared according to U.-S. Patent 1,811,959 issued to J. A. Nieuwland and may be isolated and purified by distillation under reduced pressure. Unless otherwise stated, the divinylacetylene used in these examples is a fraction boiling between 20° and 53° C. at 250 mm. pressure and is obtained by distillation from Nieuwland's reaction mixture. The tetramer of acetylene used boils at 55°—57° C. at 25 mm. pressure and is likewise obtained by distillation from Nieuwland's reaction mixture.

It has been found that the presence of a small amount of chloro-2-butadiene-1, 3 prepared by passing monovinylacetylene through an aqueous hydrochloride acid solution containing cuprous chloride and ammonium chloride, as described and claimed in the copending application of Carothers and Collins, Serial No. 490,538, filed October 27, 1930, is of advantage inasmuch as it assists the formation of homogeneous products from the divinylacetylene and natural drying oils. The amount of chloro-2-butadiene-1, 3 used preferably ranges from 5 to 15%. Where a modified synthetic drying oil containing more than one-half combined natural drying oil is desired it is important that more than 5% of chloro-2-butadiene-1,3 be used. For a still higher natural drying oil content higher proportions of chloro-2-butadiene-1,3 will be employed. Any suitable method may be used for obtaining the mixture of divinylacetylene and chloro-2-butadiene-1,3. Preferably the desired content of chloro-2-butadiene-1,3 may be obtained by the addition of the requisite amount of pure chloro-2-butadiene-1,3 prepared as described in the above described Carothers and Collins application to pure or crude divinylacetylene. Certain other chlorine compounds, for example, sulfur monochloride ($S_2Cl_2$) and tetrachloro ethylene ($C_2Cl_4$) have been found to have an effect similar to that of chloro-2-butadiene-1,3 but in less degree. A similar though not as satisfactory an effect may be produced by the addition of acetylene tetramer to divinylacetylene. It is therefore sometimes advantageous to use the crude mixture of divinylacetylene and acetylene tetramer formed by the method disclosed in the U. S patent to Nieuwland, Patent No. 1,811,959 for the preparation of the modified synthetic drying oils.

In addition to the use of chloro-2-butadiene-1,3 and similarly functioning compounds to assist the formation of homogeneous products from divinylacetylene and natural drying oils, certain other substances may also be present during the reaction in order to obtain homogeneous products. Thus, in Examples I, III, IV, and V above, maleic anhydride and phthalic anhydride are used in amounts equal to 10% or less of the natural drying oil. Their effect seems to depend upon a catalysis by which the reaction between the divinylacetylene and natural drying oil is accelerated, thus decreasing the formation of polymers of divinylacetylene which are immiscible in certain proportions with the natural drying oils. The anhydrides of other dibasic acids and the dibasic acids themselves may be used instead of those used in the above examples. Thus, satisfactory results may be obtained with maleic acid, fumaric acid, succinic anhydride, tartaric acid, and substituted phthalic acids and their anhydrides. In general, maleic acid has been found the most satisfactory, since it is effective in small concentrations and need not be removed from the final product because it remains dissolved in the film. On the other hand, when a product of low acidity is desired, phthalic anhydride may be used and later removed almost completely by cooling.

Homogeneous products may also be obtained by the use of resins such as ester gum in Example VI, instead of maleic anhydride. In such cases, it is believed that the ester gum acts as a blending agent or mutual solvent for products of the reaction which would otherwise be immiscible.

The natural drying oils used in this invention for the production of modified synthetic drying oils may be used either in their untreated state or may be subjected before reaction with the divinylacetylene or other unsaturated hydrocarbon to processes known to the art, such as heat treatment, bodying, blowing, and curing. It has been found, however, that such treatment usually makes it difficult to obtain homogeneous products with the divinylacetylene containing large proportions of the treated drying oil. Instead of the natural drying oil alone, natural drying oils in which natural or artificial gums or resins have been incorporated may be used. Examples of such products are the ordinary varnish bases. Oil modified phenol aldehyde resins, e. g., those obtained from linseed, China-wood, soya bean, etc., oils with phenol, cresol, naphthol, etc., and aldehydes such as formaldehyde, acetaldehyde, furfural, benzaldehyde, etc., and/or ketones such as acetone, methyl ethyl ketone, acetophenone, etc., may also be used. Finally, as illustrated in Example IV, esters of drying oil acids other than the naturally occurring glycerides may also be used to advantage. In addition to ester of diethylene glycol, illustrated in this example, esters of other glycols such as ethylene and propylene glycol, of monohydric alcohols such as ethyl alcohol and butyl alcohol, of polyhydric alcohols such as pentaerythrite and sorbitol, and of polyhydric ether alcohols such as benzylin, ethylin, methylin, triethylene glycol, diglycerol, triglycerol, etc., may be used.

Other modifications in carrying out the reaction between drying oils and highly unsaturated hydrocarbons, as well as coating compositions prepared from these products, will be discussed below.

In addition to the simple drying oil esters considered above, more complex esters have also been found capable of combining with highly unsaturated hydrocarbons to give modified synthetic drying oils of valuable properties. An important class of these complex esters are the so-called drying oil modified alkyd resins made by esterification of polyhydric alcohols, partially by dibasic acids and partially by drying oil acids. This phase of the invention is illustrated by the following examples:

*Example VII*

Three hundred grams of freshly distilled divinylacetylene is heated with 148 grams of a 41% solution in solvent naphtha of a modified alkyd resin containing 35% of China-wood oil and made from glycerol, phthalic anhydride, and the acids of China-wood oil, the resin being prepared by the so-called solution method described below. The resulting solution of the glyptal resin in solvent naphtha and divinylacetylene is refluxed at atmospheric pressure in an atmosphere of carbon dioxide for one hour. The temperature of the solution during the boiling is approximately 88° C. At the end of the heating, 150 grams of solvent naphtha is added and the resulting solution is subjected to vacuum distillation until about 300 grams, consisting of unchanged divinylacetylene and solvent naphtha, has distilled over. There remains a solution of the improved drying oil which may be used directly as a coating composition. The film-forming non-volatile material contains approximately 18% of combined divinylacetylene. The coating composition dries in less than one hour to a clear, homogeneous, hard film of excellent flexibility.

*Example VIII*

The same materials are heated in the same way as in Example VII, except that the heating is continued for a total of four hours. At the end of this time 100 grams of solvent naphtha is added and vaccum distillation is continued until practically all of the solvent naphtha and unchanged divinylacetylene have been removed. There remains a viscous oil containing approximately 60% of combined divinylacetylene. This oil may be used directly as a coating composition applied by brushing or may first be diluted with solvent naphtha to a viscosity suitable for application by spraying. In either case, it dries in less than one hour to a clear, homogeneous film of good flexibility and great hardness.

*Example IX*

Two hundred grams of freshly distilled divinylacetylene, in which is dissolved 20 grams of a modified glyptal resin containing 62% of linseed oil and prepared from glycerol, phthalic anhydride, and linseed oil acids, is boiled in an atmosphere of carbon dioxide and in a flask provided with a reflux condenser. After refluxing two hours, 50 grams of solvent naphtha is added and the resulting solution is distilled in vacuo until practically all of the unchanged divinylacetylene and solvent naphtha have been removed. The resulting viscous oil contains 64% of combined divinylacetylene, and may be used in the same manner as the product of Example VII, giving films similar to those of Examples VII and VIII.

The alkyd resins used in the reaction may be varied considerably in composition with this exception, that in their preferred form they contain unsaturated hydrocarbon chains similar to those occurring in natural drying oils. The polyhydric alcohol used in the preparation of the resins may be glycerol, ethylene glycol, erythrite, pentaerythrite, diethylene glycol, triethylene glycol, benzylin, butylin, hexamethylene glycol, diethylene glycol, diglycerol, triethylene glycol, triglycerol, or any other compound of this class which is stable at the temperature of reaction. The polybasic acid may be phthalic acid, maleic acid, succinic acid, diphenic acid, naphthalic acid, trimesic acid, trimellitic acid, naphthalenetetracarboxylic acid, tricarballylic acid, citric acid, malic acid, adipic acid, sebacic acid, suberic acid, pimelic acid, or their anhydrides, or any similar substances which are used ordinarily in the preparation of alkyd resins. The monobasic acid may be any highly unsaturated acid, such as eleostearic, clupanodonic, linoleic, linolenic, or mixtures of these acids obtained by the hydrolysis of natural drying oils. Saturated acids, such as stearic acid, or slightly unsaturated acids, such as abietic acid may be used in conjunction with the highly unsaturated acids. The proportions of modifying acid in the alkyd resin may also be varied but a sufficient quantity must be present to give an alkyd resin which is soluble in the highly unsaturated hydrocarbon used, or can at least be introduced in the same solution with the unsaturated hydrocarbon by the use of a mutual or blending solvent. The alkyd resins used as the starting materials is my invention may be prepared by any of the known methods, such as the so-called fusion method in which the ingredients are heated together in the absence of a solvent at a temperature generally above 150° C., or the so-called solution method in which the ingredients are dissolved in a solvent and heated in an apparatus from which the water formed in the reaction may be continuously removed. Furthermore, the alkyd resins may be prepared for the purpose of my invention by heating together suitable quantities of the drying oils themselves, polyhydric alcohol and polybasic acid. Since the alkyd resins prepared by any of the above methods contain some free phthalic or other dibasic acid or the corresponding anhydride, it is not necessary to add these acidic compounds to the reaction mixture to assist in the formation of a homogeneous product.

The following general considerations apply to the preparation of all the synthetic drying oils modified by esters of drying oil acids.

Although the above examples are limited to the use of divinylacetylene and a tetramer of acetylene, other unsaturated hydrocarbons such as other polymerizable polymers of acetylene or their partial reduction products containing at least two unsaturated bonds or homologs or isomers of these compounds may be used, although with less satisfactory results. Thus, I may employ such compounds as butadiene and its homologs, dimethyl butadiene, isoprene, and the like, as well as compounds of the type of dipropargyl which contain triple bonds but no double bonds. Furthermore, it is not necessary to use pure compounds in making the synthetic drying oils. In fact, it is sometimes advantageous to use mixtures of unsaturated hydrocarbons, such as those formed by further hydrogenation of divinylacetylene to a mixture containing such compounds as divinyl ethylene, vinyl ethyl ethylene, and vinyl ethyl acetylene. In all cases, the unsaturated hydrocarbons which are reacted with the drying oils, have in themselves no drying oil characteristics.

The reaction between the unsaturated hydrocarbon and the ester of a drying oil acid may be carried out by heating at any temperature below that at which the ingredients decompose, the system being subjected to more than atmospheric pressure when necessary to confine the vapors. In general, it has been found that a temperature between 80° and 100° C. to be the most suitable for divinylacetylene and for acetylene tetramer, while higher temperatures are preferable for the more nearly saturated hydrocarbons. The heating may be continued to any point short of the formation of an insoluble gel and is interrupted when a sufficient quantity of the unsaturated hydrocarbon has reacted to give a product of the desired composition.

The rate of reaction may be increased by increasing the temperature or pressure, by catalysts such as benzoyl peroxide, and by air or oxygen with or without the presence of metallic compounds known in the varnish art as driers. On the other hand, the rate may be decreased by dilution with solvents such as aromatic hydrocarbons and by antioxidants, for example, phenols such as eugenol or hydroquinone, or amines such as dibutylamine and phenyl betanaphthylamine. Although the presence of oxygen accelerates the reaction, it is usually undesirable since it often causes a rapid formation of an insoluble gel and also tends to form explosive compounds with divinylacetylene and acetylene tetramer. Hence, it is generally advantageous to carry out the reaction in the presence of an inert gas such as carbon dioxide or nitrogen.

The preparation of modified synthetic drying oils forming the subject of this invention may be carried out as a continuous process by passing the ingredients, preferably dissolved in a solvent, continuously through a heated tube at such a rate as to cause the issuing material to have reached the desired stage of reaction. The solvent and unchanged unsaturated hydrocarbon may then be removed.

In general, the percentage of divinylacetylene or other unsaturated hydrocarbon combined in the modified synthetic drying oil may be varied from about 0% to below 100%. The percentage depends upon the proportion of unsaturated hydrocarbon used in the starting materials and upon the time and temperature of the reaction. The higher the temperature, the longer the heating, and the greater the proportion of hydrocarbon at the start, the greater is the proportion of combined hydrocarbon in the finished product. Because of the tendency of modified synthetic drying oil to become insoluble and therefore useless as a coating composition on long heating, it is usually advantageous to start with a large excess of the hydrocarbon and to interrupt the heating when only a portion of this has been converted. The unused excess may, of course, be recovered and used again.

The products thus obtained by heating together highly unsaturated hydrocarbons and esters of drying oil acids are more or less viscous, nonvolatile oils of yellow or brown color. They are soluble in hydrocarbons of the aromatic series and are in general miscible with natural drying oils, with polymers of unsaturated hydrocarbons such as divinylacetylene, and with drying oil modified alkyd resins, as well as with most of the natural and synthetic gums and resins used in the art of varnish making. They dry and harden much more rapidly than the natural drying oils, the rate of drying being accelerated by the addition of metallic driers and retarded by the addition of antioxidants, as is the case with the natural drying oils. Antioxidants, particularly slightly volatile phenols such as eugenol, guaiacol, guaiethol, cresol, hydroxydiphenyls, etc., are useful in preventing a wrinkling of the surface which sometimes occurs during the drying of the modified synthetic drying oils containing relatively large proportions of combined divinylacetylene. These antioxidants function in amounts so small as not to seriously affect the rate of drying. Their presence also prevents the skinning of the drying oils when exposed to small quantities of air in containers. The prevention of wrinkling may also be brought about by the addition of metallic driers. Films containing more than a relatively small amount of combined unsaturated hydrocarbon become very hard soon after drying and are not dissolved or softened by organic solvents or water and are only very slightly permeable to gases such as hydrogen sulfide. In these respects, they differ markedly from the natural drying oils and from the varnishes made therefrom. On the other hand, the dried films of the products of this invention are flexible and adhere well to metallic and other surfaces, being in these respects markedly superior to the unmodified polymers of unsaturated hydrocarbons such as divinylacetylene.

Either with or without the addition of solvents or of other film-forming materials the products of this invention may be used in general for all purposes for which drying oils and varnishes are used, and because of the valuable properties enumerated above, they yield coating compositions and other products which are in many cases superior to those now in use. Furthermore, these properties make the products of this invention useful for many purposes for which no satisfactory product can be made with the materials generally known to the varnish art. Examples of uses in which rapid drying and hardening are particularly desirable and for which new products are therefore particularly suitable are (1) undercoats applied to wood, metal, or other materials in order to form a suitable base for other finishing materials, and (2) finishes for floors and furniture. Because of their resistance to solvents and to corrosive and other substances which rapidly attack the compositions now in use, protective coatings made from the products of this invention may be used for many purposes for which no material, with the exception of the polymers of unsaturated hydrocarbons disclosed in the above patents, has heretofore been available. Thus, the modified synthetic drying oils, like the synthetic drying oils prepared from highly unsaturated hydrocarbons preferably after the incorporation of suitable pigments, may be used for the protection of the interiors of petroleum tanks which, if unprotected, are rapidly attacked by the sulfur compounds present. Similarly, the products of the present invention may be used for the protection of the interior of steel vessels containing organic solvents, fatty acids, food-stuffs, and the like, which would otherwise be contaminated by the products of their reaction with the steel. Similarly, the products of the present invention and of the above cited Collins Patents Nos. 1,812,849 and 1,812,544 may be used for the coating of shoe lasts to form smooth surfaces which the cements used in shoe manufacture will not soften and to which they will not adhere.

In addition to coating compositions the products of this invention may be used for the impregnation and/or coating of cloth, paper, regenerated cellulose film, etc., to increase, for instance, their oil-, odor-, gas-, water-, and electrical resistance and also the production of molding compositions by a process analogous to that disclosed in patent application of Calcott and Reynolds, Serial No. 344,094, filed March 8, 1930, which in brief relates to the preparation of molding compositions by admixture of divinylacetylene or similar acetylene polymer with a filler and/or antioxidant or other modifying agent, and to the molding of the said compositions by the use of elevated temperature and superatmospheric pressure. The products of this invention may also be used as adhesives, e. g., in cementing cloth, paper, etc. to smooth or porous surfaces, e. g., metal, wood, pyroxylin, leather, glass, stone, paper, cloth, etc.

A description of the preparation of clear varnishes using the modified synthetic drying oils of this invention has been given above for instance, in Examples I to VII. The following examples illustrate the use of the modified synthetic drying oils in pigmented coating compositions.

*Example X*

93.5 grams of the product of Example VI is ground for 24 hours in a ball mill with 157.5 g. of amorphous silica, 52.5 g. of asbestine and 30 g. of solvent naphtha. The resulting paint is then thinned with 20 g. more of solvent naphtha and is then ready for application by brushing, spraying, or other known methods. It rapidly gives a hard, grayish-yellow coating which is very resistant to the action of hydrogen sulfide, water, and hydrocarbons and hence may advantageously be used for coating the interiors of crude petroleum tanks.

*Example XI*

145.8 grams of the product of Example III is ground as in the above example with 154.2 g. of zinc oxide and 20 g. of solvent naphtha. This yields a white enamel, which yields a hard, glossy, flexible film.

*Example XII*

Two hundred ninety seven grams of an 82% solution in solvent naphtha of a modified synthetic drying oil similar to that of Example X, but prepared by heating for only one hour and containing 47% of combined divinylacetylene, is ground in a ball mill with 4.6 g. of ferric oxide, 192 g. of china clay, 80 g. of carbon black, 240 g. of asbestine, 192 g. of talc and 583 g. of solvent naphtha. After grinding for 24 hours, 435 g. more of the modified synthetic drying oil solution, 236 g. of toluene and 41 g. of cobalt drier solution are added. The resulting composition may be used as an undercoat as follows: One or more coats are applied by spraying to a smooth steel surface, then baked for one-half hour at 71° C. The coating may then be sanded smooth by the usual methods and is ready for the application of finishing coats. The above composition contains about twice the amount of non-volatile materials at spraying viscosity that is commonly present in the undercoat materials usually used in the art, and hence requires the application of only a small number of coats for the formation of a thick film. These films, in addition to their rapid hardening, have good sanding properties and good adhesion to metal.

The above examples are illustrative of the wide variety of coating compositions which may be prepared from the modified synthetic drying oils. Other coating compositions may be made from the modified synthetic drying oils by following the methods used for making coating compositions from the unmodified synthetic drying oils, i. e., the polymers of divinylacetylene and other unsaturated hydrocarbons as disclosed in U. S. Patent 1,812,544 issued to A. M. Collins, and also in the copending application of A. M. Collins, Serial No. 541,659, filed June 2, 1931. The last-named application in brief describes the preparation of pigmented coating compositions by mixing synthetic drying oils prepared according to the method of Collins Patent No. 1,812,894 with various pigments in proportions varying from the amount of polymer suitable for decorative coatings to much greater amounts suitable for the production of durable undercoats and the like.

The above description relates to the applicant's preferred form of invention, namely, the preparation of interpolymers of divinylacetylene and related hydrocarbons and drying oils. It is desired however to state that polymers of divinylacetylene and related hydrocarbons prepared by polymerization with other film-forming agents in lieu of drying oils, are within the scope of the invention, although the drying oil interpolymers show the most satisfactory properties. Examples of this latter class of polymers are those prepared by polymerization of divinylacetylene, acetylene, tetramer, and the like with any of the following compositions and compounds or mixtures of the same:

(1) Natural gums and resins such as rosin, oxidized pinene, and ester gum; (2) synthetic resins of the following types: Phenol-aldehyde, aldol, polyvinyl acetate, polyvinyl chloride, metastyrol, acetone-formaldehyde, chlorinated diphenyl, and furfural-acetone; (3) materials which will form resins on polymerization such as acetaldehyde, styrol, vinyl acetate, acetone-formaldehyde, p-hydroxy-diphenyl-formaldehyde, furfural, diethyl fumarate, furfural acetone, furyl ethylene, and phenol-trioxy-methylene; and (4) cellulosic derivative such as cellulose ethers, e. g., ethyl cellulose.

These materials may be classed as film-forming materials, or as materials capable of being polymerized to give film-forming materials. By "film-forming materials" is meant those materials which will polymerize, oxidize, set or dry from solution to give hard, resistant resinous films.

The term "synthetic drying oil" as used thruout the specification has been chosen as a convenient means for referring to the novel drying oils constituting the present invention. The term is intended to cover drying oils which may serve as a substitute for the natural drying oils.

When polymerizing divinylacetylene, etc. in the presence of compounds within this latter group, it is only necessary to carry the polymerization to a point at which the desired proportion of combined divinylacetylene is formed. It is believed that a true reaction or interpolymerization takes place, but regardless of theory, the process produces novel compositions which are highly useful as drying oils. The properties of divinylacetylene polymers may also be modified by polymerizing in the presence of such softeners as dibutyl phthalate, dixylyl ethane, castor oil, tricresyl phosphate, etc., and in the presence of drying oil acids.

The scope of the invention is intended to exclude the polymerization of divinylacetylene and related hydrocarbons in the presence of preformed polymers of the same, and the claims are intended to be construed accordingly.

The above description and specific examples are illustrative only and are not to be construed as limiting the scope of the invention. Any modification or variation therefrom which conforms to the spirit of the invention is intended to be included within the scope of the claims.

I claim:

1. A composition prepared by polymerizing a polymerizable open-chain acetylene polymer in the presence of an ester of a drying oil acid and stopping the polymerization before an insoluble gel is formed.

2. A composition prepared by polymerizing divinylacetylene in the presence of an ester of a drying oil acid and stopping the polymerization before an insoluble gel is formed.

3. A composition prepared by polymerizing an open-chain acetylene tetramer in the presence of an ester of a drying oil acid and stopping the polymerization before an insoluble gel is formed.

4. A composition prepared by polymerizing a polymerizable open-chain acetylene polymer in the presence of an ester of a drying oil acid in the presence of a catalyst and stopping the polymerization before an insoluble gel is formed.

5. A composition prepared by polymerizing a polymerizable open-chain acetylene polymer in the presence of an ester of a drying oil acid and in the presence of a member of the group consisting of chloro-2-butadiene-1,3, sulfur monochloride, tetrachloroethylene, polybasic acids and their anhydrides, ester gums and acetylene tetramer and stopping the polymerization before an insoluble gel is formed.

6. A composition prepared by polymerizing a polymerizable open-chain acetylene polymer in the presence of an ester of a drying oil acid and in the presence of a polybasic acid and stopping the polymerization before an insoluble gel is formed.

7. A composition prepared by polymerizing a polymerizable open-chain acetylene polymer in the presence of a drying oil-modified polybasic acid-polyhydric alcohol condensation product and stopping the polymerization before an insoluble gel is formed.

8. A composition prepared by polymerizing divinylacetylene in the presence of a drying oil-modified polybasic acid-polyhydric alcohol condensation product and stopping the polymerization before an insoluble gel is formed.

9. The process which comprises polymerizing a polymerizable open-chain acetylene polymer in the presence of an ester of a drying oil acid and stopping the polymerization before an insoluble gel is formed.

10. A process which comprises polymerizing divinylacetylene in the presence of an ester of a drying oil acid and stopping the polymerization before an insoluble gel is formed.

11. A process which comprises polymerizing an open-chain acetylene tetramer in the presence of an ester of a drying oil acid and stopping the polymerization before an insoluble gel is formed.

12. The process which comprises polymerizing a polymerizable open-chain acetylene polymer in the presence of an ester of a drying oil acid and in the presence of a catalyst and stopping the polymerization before an insoluble gel is formed.

13. The process which comprises polymerizing a polymerizable open-chain acetylene polymer in the presence of an ester of a drying oil acid in the presence of a member of the group consisting of chloro-2-butadiene-1,3, sulfur monochloride, tetrachloroethylene, polybasic acids and their anhydrides, ester gums and acetylene tetramer and stopping the polymerization before an insoluble gel is formed.

14. The process which comprises polymerizing a polymerizable open-chain acetylene polymer in the presence of an ester of a drying oil acid in the presence of a polybasic acid and stopping the polymerization before an insoluble gel is formed.

15. The process which comprises polymerizing a polymerizable open-chain acetylene polymer in the presence of a drying oil-modified polybasic acid-polyhydric alcohol condensation product and stopping the polymerization before an insoluble gel is formed.

16. The process which comprises polymerizing divinylacetylene in the presence of a drying oil-modified polybasic acid-polyhydric alcohol condensation product and stopping the polymerization before an insoluble gel is formed.

17. A composition prepared by polymerizing a polymerizable open-chain acetylene polymer in the presence of an ester of a drying oil acid, then stopping the polymerizing before an insoluble gel is formed and distilling the product to remove unchanged acetylene polymer.

18. The process which comprises polymerizing a polymerizable open-chain acetylene polymer in the presence of an ester of a drying oil acid and in the presence of a solvent for the polymerizable acetylene polymer, then stopping the polymerization before an insoluble gel is formed.

19. The process which comprises polymerizing a polymerizable open-chain acetylene polymer in the presence of an ester of a drying oil acid, heating the mixture until a substantial proportion of the reaction product has been produced and before an insoluble gel is formed, then removing the unreacted hydrocarbon.

20. A composition prepared by polymerizing a polymerizable open-chain acetylene polymer in the presence of an ester of a drying oil acid and in the presence of a solvent for the polymerizable acetylene polymer and stopping the polymerization before an insoluble gel is formed.

21. A composition prepared by polymerizing a polymerizable open-chain acetylene polymer in the presence of an ester of a drying oil acid and in the presence of an anhydride of a polybasic acid and stopping the polymerization before an insoluble gel is formed.

22. The process which comprises polymerizing a polymerizable open-chain acetylene polymer in the presence of an ester of a drying oil acid and in the presence of an anhydride of a polybasic acid and stopping the polymerization before an insoluble gel is formed.

23. The product described in claim 2 further characterized in that the ester is a naturally occurring material.

24. A composition prepared by polymerizing divinylacetylene in the presence of an ester of a drying oil acid and in the presence of 5-15% of chloro-2-butadiene-1,3 and stopping the polymerization before an insoluble gel is formed.

25. A composition prepared by polymerizing divinylacetylene in the presence of a drying oil modified polybasic acid-polyhydric alcohol condensation product and in the presence of 5-15% of chloro-2-butadiene-1,3 and stopping the polymerization before an insoluble gel is formed.

26. A composition prepared by polymerizing divinylacetylene in the presence of an ester of a drying oil acid and in the presence of a polybasic acid and stopping the polymerization before an insoluble gel is formed.

27. A composition prepared by polymerizing divinylacetylene in the presence of a drying oil modified polybasic acid-polyhydric alcohol condensation product and in the presence of a dibasic acid and stopping the polymerization before an insoluble gel is formed.

28. A composition prepared by polymerizing divinylacetylene in the presence of an ester of a drying oil acid and in the presence of an anhydride of a polybasic acid and stopping the polymerization before an insoluble gel is formed.

29. A composition prepared by polymerizing divinylacetylene in the presence of a drying oil modified polybasic acid-polyhydric alcohol condensation product and in the presence of an anhydride of a dibasic acid and stopping the polymerization before an insoluble gel is formed.

30. A composition prepared by polymerizing a polymerizable open-chain acetylene polymer in the presence of a drying oil modified resin and stopping the polymerization before an insoluble gel is formed.

31. A composition prepared by polymerizing divinylacetylene in the presence of a drying oil modified resin and stopping the polymerization before an insoluble gel is formed.

32. A composition prepared by polymerizing divinylacetylene in the presence of a resinous mixed ester of a polyhydric alcohol with a polycarboxylic acid and a drying oil acid, and stopping the polymerization before an insoluble gel is formed.

33. A composition prepared by polymerizing divinylacetylene in the presence of an ester of a drying oil acid and in the presence of a solvent for the two compounds and stopping the polymerization before an insoluble gel is formed.

34. A process which comprises heating divinylacetylene in the presence of an ester of a drying oil acid and stopping the polymerization before an insoluble gel is formed.

35. A process which comprises heating divinylacetylene to 80-100° C. in the presence of an ester of a drying oil acid and stopping the polymerization before an insoluble gel is formed.

36. The process of claim 34 characterized in that a large excess of divinylacetylene is employed.

37. The process of claim 35 characterized in that a large excess of divinylacetylene is employed and in that the process is carried out continuously by passing the ingredients dissolved in a solvent through a heated tube.

ARNOLD M. COLLINS.

CERTIFICATE OF CORRECTION.

Patent No. 2,078,194. April 20, 1937.

ARNOLD M. COLLINS.

It is hereby certified that error appears in the printed specification of the above numbered patent requiring correction as follows: Page 1, first column, line 59, for "parilla" read perilla and for "China" read Chia; and that the said Letters Patent should be read with these corrections therein that the same may conform to the record of the case in the Patent Office.

Signed and sealed this 29th day of June, A. D. 1937.

(Seal)

Henry Van Arsdale
Acting Commissioner of Patents.